| (12) | United States Patent | (10) Patent No.: | US 8,220,449 B2 |
|---|---|---|---|
| | Rheault | (45) Date of Patent: | Jul. 17, 2012 |

(54) PORTABLE STOVE

(75) Inventor: Martin Rheault, Candiac (CA)

(73) Assignee: Solhuma, Inc., Montreal, Quebec (CA)

( * ) Notice: Subject to any disclaimer, the term of this patent is extended or adjusted under 35 U.S.C. 154(b) by 241 days.

(21) Appl. No.: 11/886,690

(22) PCT Filed: Jan. 31, 2007

(86) PCT No.: PCT/CA2007/000137
§ 371 (c)(1),
(2), (4) Date: Sep. 19, 2007

(87) PCT Pub. No.: WO2007/093033
PCT Pub. Date: Aug. 23, 2007

(65) Prior Publication Data
US 2009/0020109 A1    Jan. 22, 2009

Related U.S. Application Data

(60) Provisional application No. 60/773,667, filed on Feb. 16, 2006.

(51) Int. Cl.
*A47J 33/00* (2006.01)
*A47J 37/07* (2006.01)
*F24B 1/19* (2006.01)
*F24C 1/16* (2006.01)

(52) U.S. Cl. ...................................... 126/25 R; 126/9 R

(58) Field of Classification Search ................ 126/25 R, 126/5, 110 E, 9 R; 99/421 M
See application file for complete search history.

(56) References Cited

U.S. PATENT DOCUMENTS

| 3,279,452 | A | * | 10/1966 | Hottenroth et al. ......... 126/25 R |
| 3,683,886 | A | | 8/1972 | Metzner et al. |
| 3,868,943 | A | * | 3/1975 | Hottenroth et al. ......... 126/25 R |
| 3,982,522 | A | * | 9/1976 | Hottenroth et al. ............... 126/2 |
| 4,149,514 | A | | 4/1979 | Latouf |
| 4,192,284 | A | | 3/1980 | Vache |
| 4,281,634 | A | * | 8/1981 | Bane, III ....................... 126/119 |
| 4,455,992 | A | | 6/1984 | Hsiao |
| 4,471,751 | A | | 9/1984 | Hottenroth et al. |
| 4,508,094 | A | | 4/1985 | Hait |
| 4,569,327 | A | | 2/1986 | Velten |
| 4,630,593 | A | | 12/1986 | Gremillion |

(Continued)

FOREIGN PATENT DOCUMENTS

EP       0 180 849       5/1986

(Continued)

OTHER PUBLICATIONS

International Search Report dated Apr. 13, 2007, issued in PCT/CA2007/00137.

*Primary Examiner* — Steven B McAllister
*Assistant Examiner* — Frances H Kamps
(74) *Attorney, Agent, or Firm* — Harrington & Smith

(57) ABSTRACT

An autonomous or battery powered foldable stove using dry biomass as combustion fuel is described herein. The device includes a base that contains an air flow generator having an inlet and an outlet. The outlet is in fluid communication trough a diffuser plate supporting the combustible to provide air thereto when the kit is functionally assembled and in operation. The stove defines a compact portable, stackable and autonomous device which can be stored for and then used in extreme situations, such as following a natural disaster.

23 Claims, 11 Drawing Sheets

U.S. PATENT DOCUMENTS

| | | | |
|---|---|---|---|
| 4,673,863 A * | 6/1987 | Swarbrick | 322/2 R |
| 4,714,013 A | 12/1987 | Telfer | |
| 4,726,350 A | 2/1988 | Steinhauser | |
| 4,730,597 A | 3/1988 | Hottenroth et al. | |
| 4,794,906 A | 1/1989 | Longley, Jr. | |
| 4,909,235 A | 3/1990 | Boetcker | |
| 4,924,847 A * | 5/1990 | Patenaude | 126/77 |
| 5,024,208 A * | 6/1991 | Hottenroth et al. | 126/25 R |
| 5,065,735 A | 11/1991 | Bourgeois et al. | |
| 5,179,932 A | 1/1993 | DeCarlo | |
| 5,299,931 A | 4/1994 | Lee | |
| 5,495,845 A * | 3/1996 | Hait | 126/9 R |
| 5,711,210 A | 1/1998 | Kaufman | 99/340 |
| 5,785,046 A * | 7/1998 | Colla | 126/9 R |
| 5,996,572 A * | 12/1999 | Ilagan | 126/25 AA |
| 6,223,737 B1 * | 5/2001 | Buckner | 126/25 R |
| 6,257,227 B1 * | 7/2001 | Harbin | 126/5 |
| 6,314,955 B1 * | 11/2001 | Boetcker | 126/9 R |
| 6,579,060 B1 * | 6/2003 | Mann et al. | 415/119 |
| 6,745,673 B1 * | 6/2004 | Martinez | 99/421 H |
| 6,941,941 B1 | 9/2005 | Hall | |
| 7,168,363 B1 * | 1/2007 | Brown | 99/421 M |
| 7,188,617 B1 * | 3/2007 | O'Blenes | 126/25 R |
| 7,382,047 B2 * | 6/2008 | Chen et al. | 257/706 |
| 7,766,004 B1 * | 8/2010 | Bourgeois | 126/25 R |
| 2001/0035175 A1 | 11/2001 | Lautner | 126/9 |
| 2003/0015188 A1 * | 1/2003 | Harbin | 126/25 R |
| 2005/0034716 A1 * | 2/2005 | Harbin | 126/25 R |
| 2005/0205076 A1 * | 9/2005 | Boucher | 126/25 R |

FOREIGN PATENT DOCUMENTS

| | | |
|---|---|---|
| WO | WO 99/21465 | 5/1999 |
| WO | WO 01/23808 A1 | 4/2001 |
| WO | WO 2004/004527 A1 | 1/2004 |
| WO | WO 2005/063096 A1 | 7/2005 |

* cited by examiner

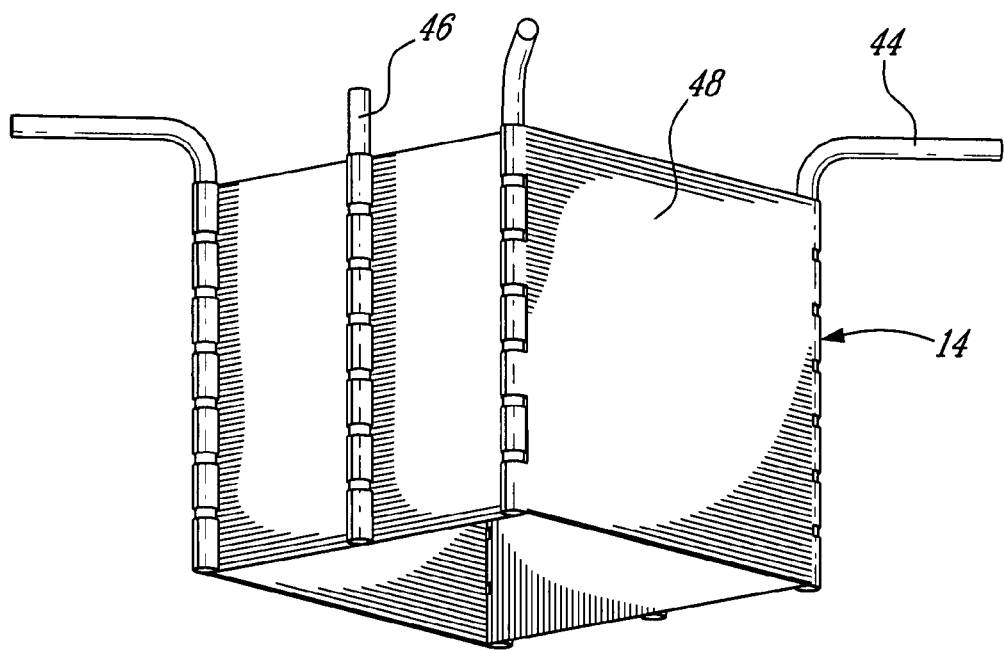
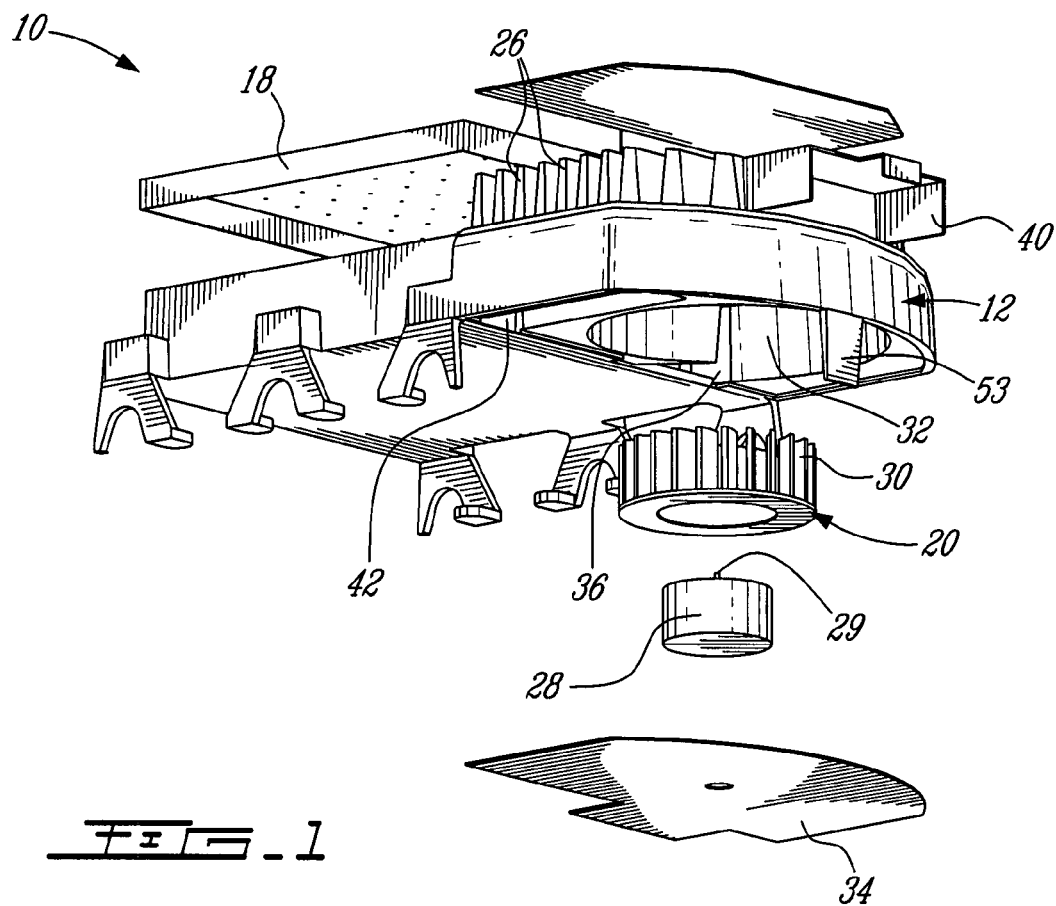
FIG_1

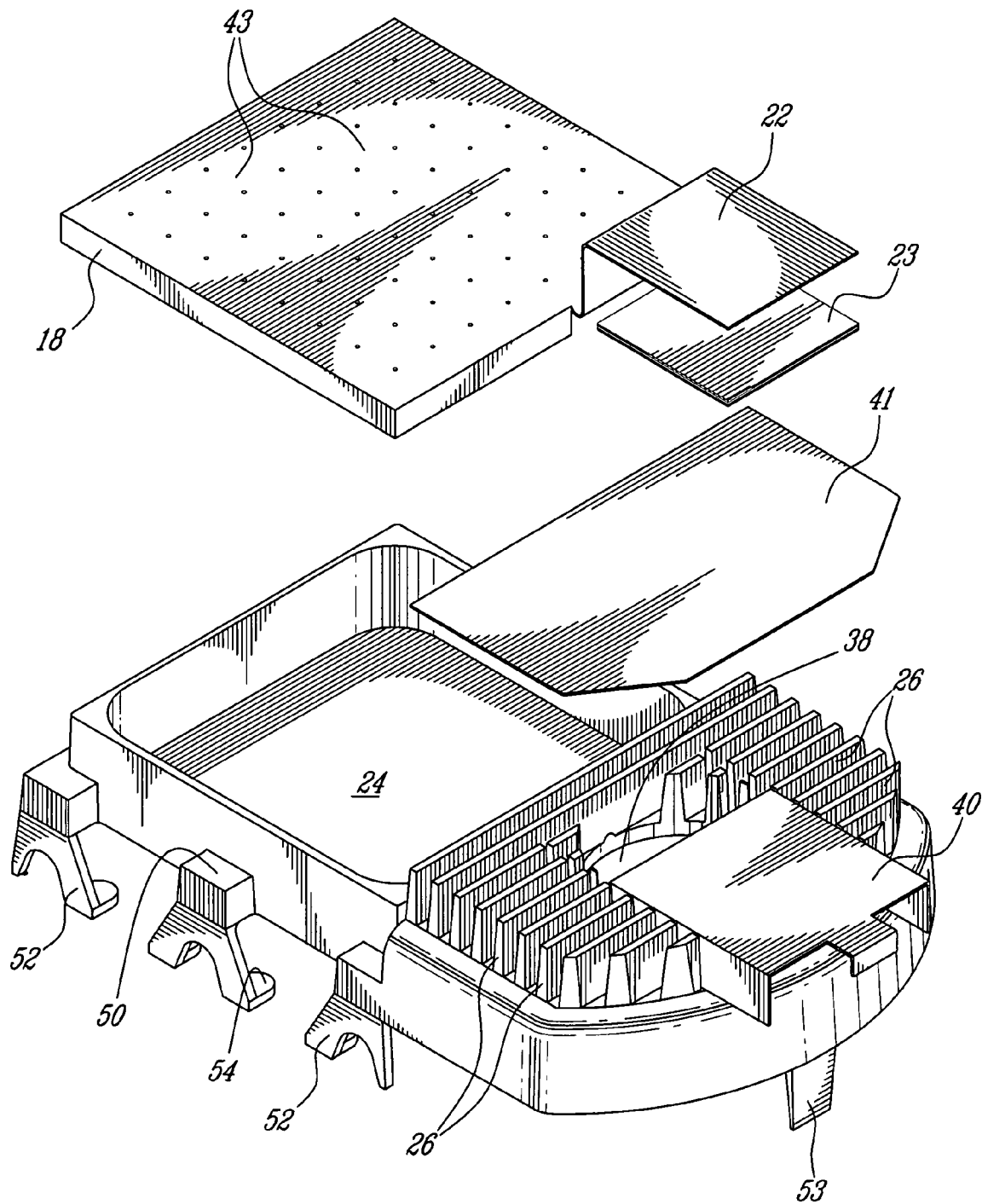
FIG_2

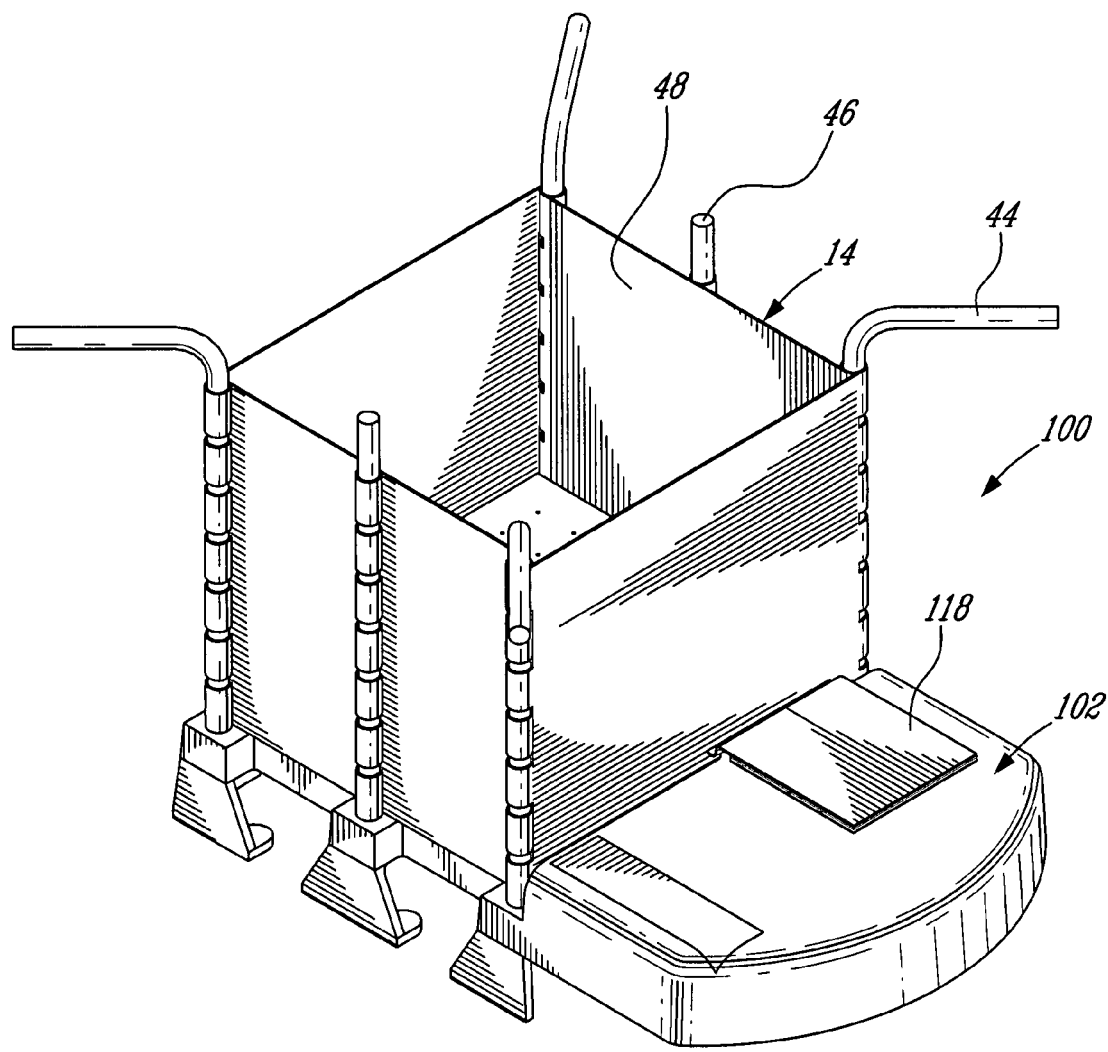
FIG_3

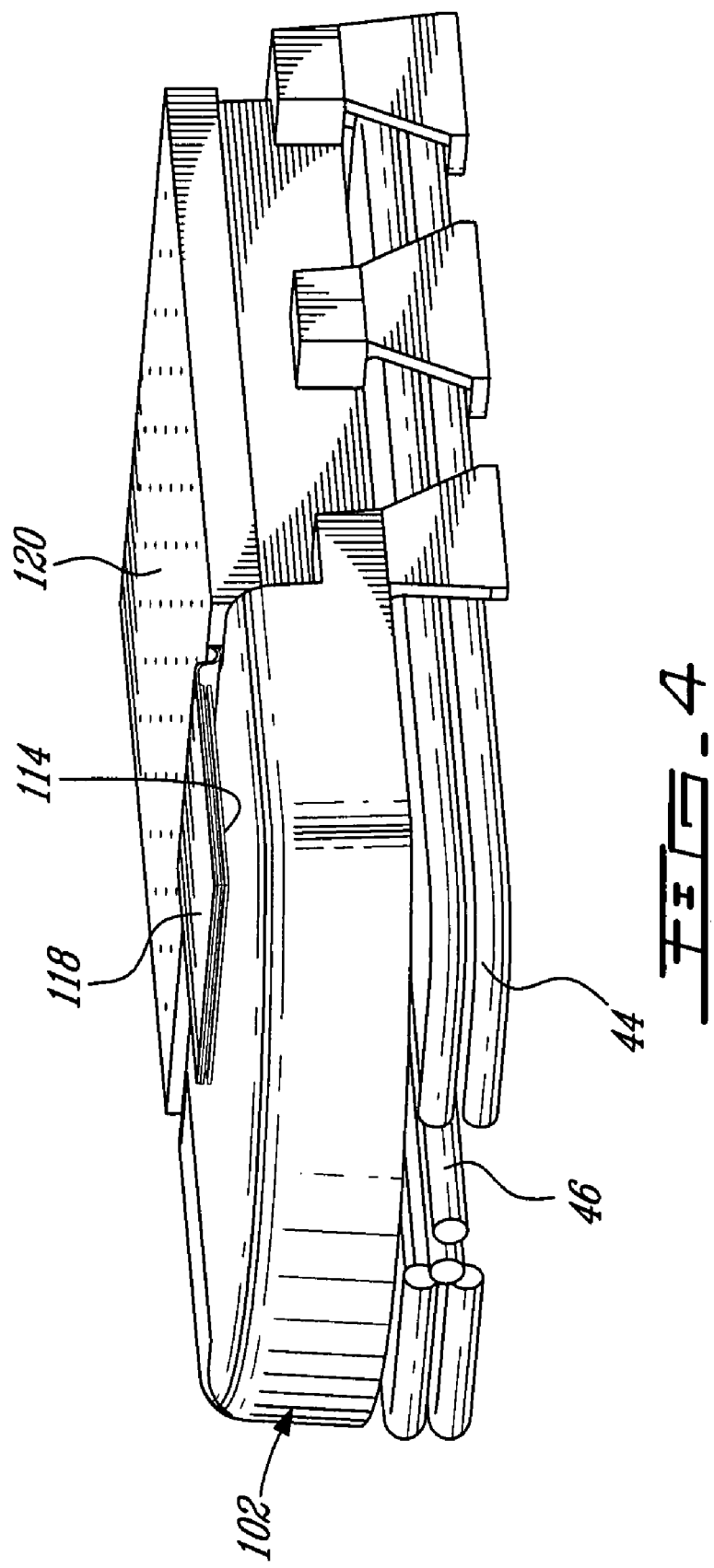

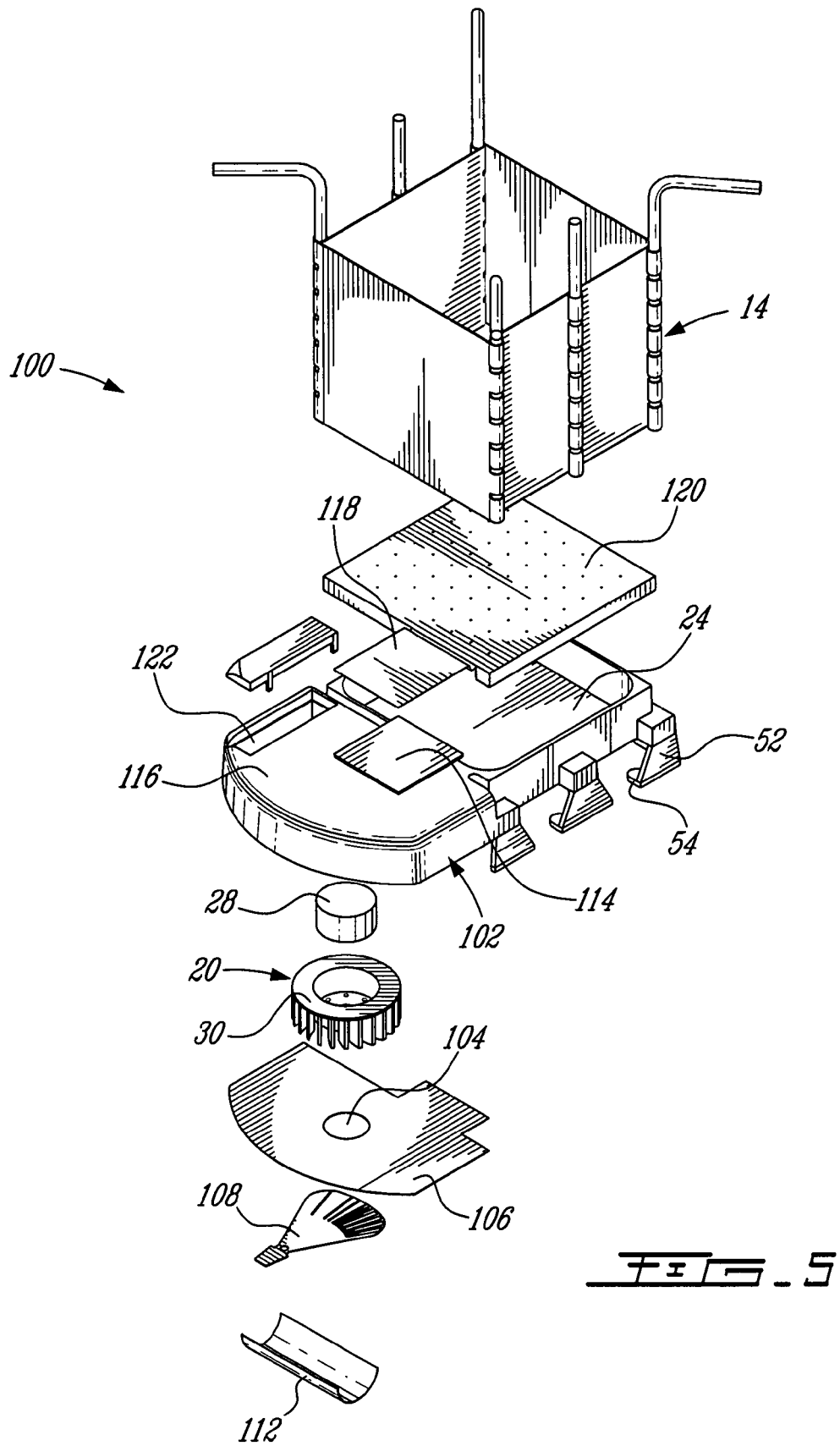

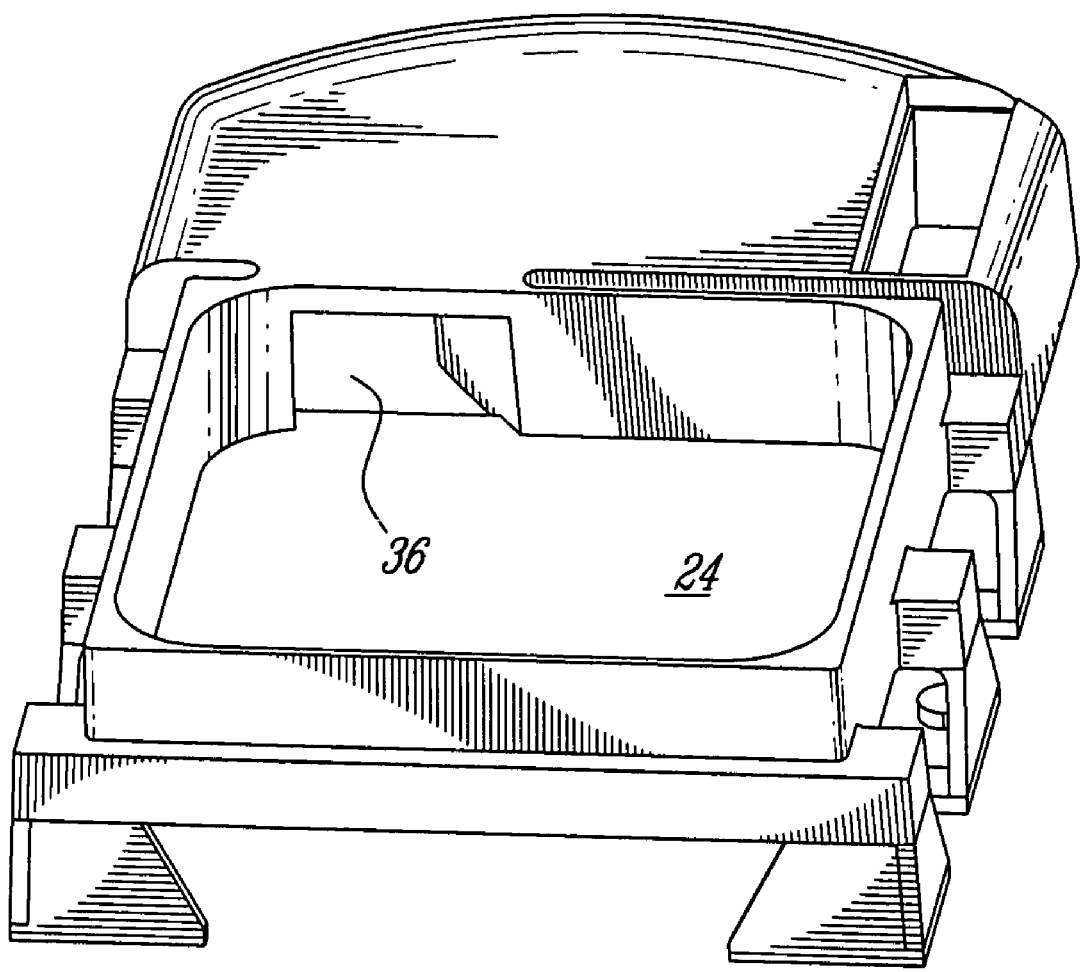
FIG_6

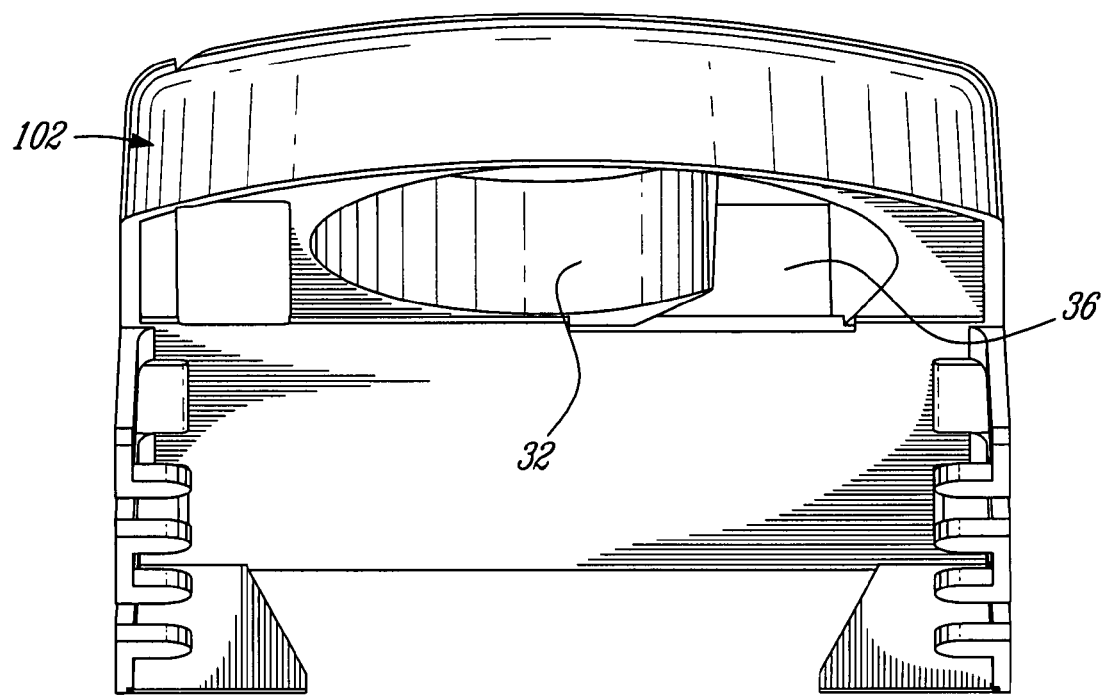
FIG_7

FIG_10

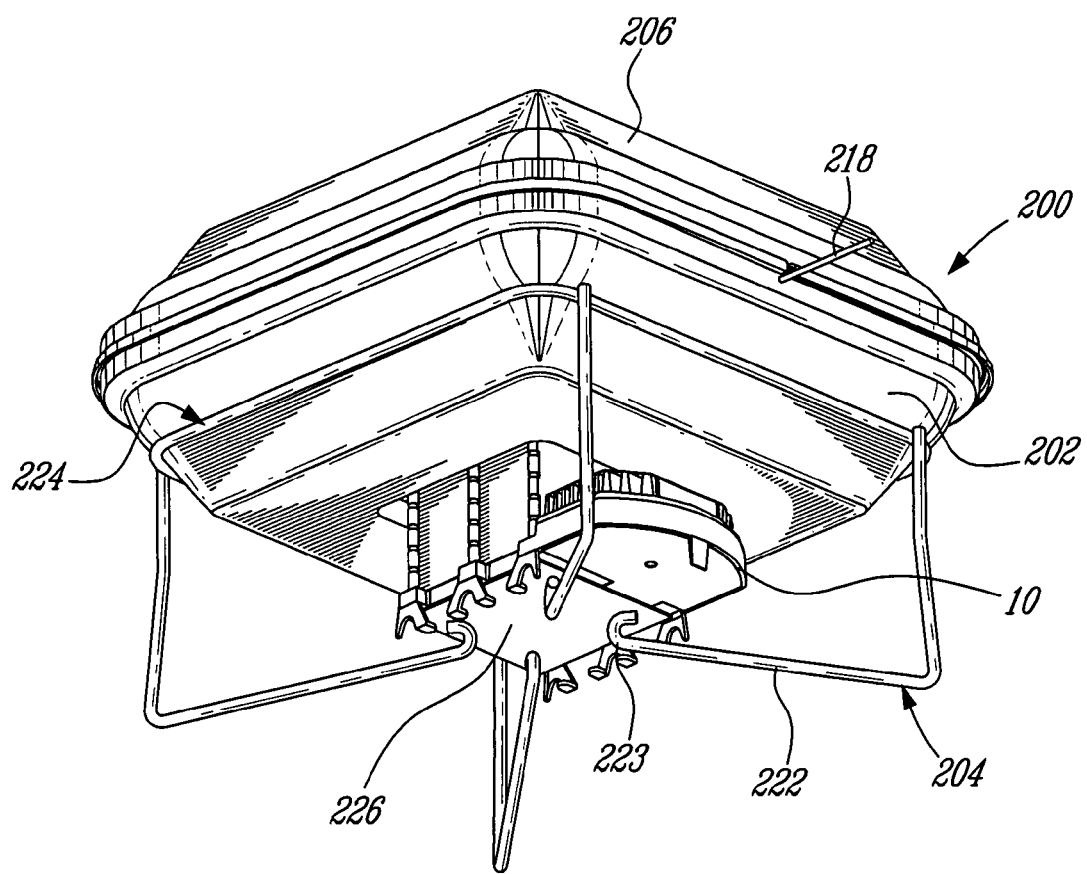
FIG_12

PORTABLE STOVE

FIELD

The present invention concerns a cooking device and more specifically an autonomous portable and foldable stove.

BACKGROUND

Portable stoves are known in the art. They are often provided with foldable portions that facilitate their transport. Mainly used for camping related activities, conventional portable stoves often use pressurized fluid combustible that can be dangerous to handle.

BRIEF DESCRIPTION OF THE DRAWINGS

FIG. 1 is an exploded perspective bottom view of a portable stove according to a first illustrative embodiment of the present invention;

FIG. 2 is an exploded perspective top view of the portable stove of FIG. 1, shown without the foldable shield;

FIG. 3 is a perspective view of a portable stove according to a second illustrative embodiment of the present invention illustrating the stove in a deployed configuration FIG. 4 is a perspective view of the foldable stove of FIG. 3, illustrating the stove in a packed configuration;

FIG. 5 is a perspective exploded view of the portable stove of FIG. 3;

FIG. 6 is a perspective top view of the base of the portable stove of FIG. 3;

FIG. 7 is a perspective bottom view of the base of the portable stove of FIG. 3;

FIG. 12 is a bottom perspective view of the BBQ of FIG. 10.

Figure 8:
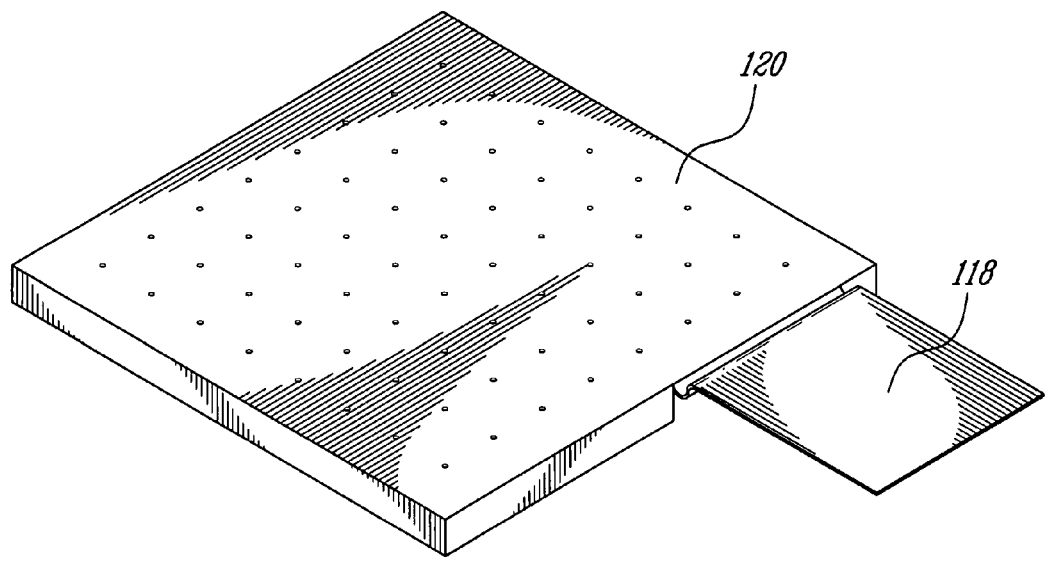
FIG. 8 is a perspective view of the diffuser plate of the portable stove of FIG. 3.

While the invention will be described in conjunction with illustrated embodiments, it will be understood that it is not intended to limit the scope of the invention to such embodiments.

DETAILED DESCRIPTION

Generally stated, according to illustrative embodiments of the present invention there is provided an autonomous or battery powered foldable stove using dry biomass as combustion fuel. The device includes a base that contains an air flow generator having an inlet and an outlet. The outlet is in fluid communication trough a diffuser plate supporting the combustible to provide air thereto when the kit is functionally assembled and in operation.

According to illustrative embodiments, the air flow generator is used in a combustion system to supply air at controllable flow rates to a diffuser chamber. An inlet air control mechanism is provided.

The stove according to illustrative embodiments of the present invention also includes a foldable shield including six hinges. When the shield is deployed, it fits around the diffuser plate to protect the user from the heat. The deployed shield further acts as a chimney to pull the heat to the top heating position. Six rods extending from the hinges allows to hold and position a cooking recipient, such as a casserole on top of the chimney. The four corner rods are bended at 90° at the top to yield a more stable support for the recipient. They can also be swiveled to adjust to the size and shape of the recipient.

While in a folded configuration, the shield can be stored under the base, thereby reducing considerably the volume of the device, which then becomes a compact storable and stackable unit.

The stackability, portability and autonomy of the device render its storing for and then use particularly convenient in extreme or survival situations, such as following a natural disaster.

According to illustrative embodiments, the air flow generator gets its power from an autonomous energy source generated by the heat itself. For example, a Peltier junction cell can be used to create an electrical current when a temperature differential is present between its two faces. The heat energy is then brought in contact with one of the faces from the diffuser plate. The other face is cooled by the airflow of the blower running against the top wall of the outlet.

A portable stove according to illustrative embodiments of the present invention is therefore relatively autonomous, safe, compact, and easily transportable in an individual baggage for example. It can be stored for a long period and transported safely in any vehicle.

More specifically, in accordance with a first aspect of the present invention, there is provided a portable stove using dry biomass as a combustible, the stove comprising:

a base provided with a diffusion chamber and an air channel having an outlet in fluid connection with the diffusion chamber and an inlet;

a diffuser plate mounted to the diffusion chamber; the diffuser plate defining a biomass support and being provided with at least one aperture;

an air flow generator so associated with the inlet of the air channel as to positively pressurize the diffusion chamber with air;

whereby the air positively pressurizing the diffusion chamber exhausting through the at least one aperture of the diffuser plate to thereby oxygenate the combustion of the biomass.

According to a second aspect of the present invention, there is provided a BBQ grill comprising a pan supported on legs, the pan including a generally central aperture so configured and sized as to receive the above-described portable stove.

Other objects, advantages and features of the present invention will become more apparent upon reading the following non restrictive description of illustrated embodiments thereof, given by way of example only with reference to the accompanying drawings.

It is to be noted that the expression "air flow generator" is to be construed herein and in the appended claims as any means that can be used to displace air such as a blower, a motorized fan or an air pump, for example.

In the following description, similar features in the drawings have been given similar reference numerals, and in order not to weigh down the figures, some elements are not referred to in some figures if they were already identified in a precedent figure.

A portable stove 10 according to a first illustrative embodiment of the present invention will now be described with reference to FIGS. 1 and 2.

The portable stove 10 comprises a base 12, a foldable shield and holder 14, configured to be movable between a deployed configuration (shown in FIG. 1) and a folded configuration (not shown), a diffuser plate 18 removably mounted to the base 12, and an air flow generator 20 in the form of a blower fan secured to the base 12.

As can be better seen from FIG. 2, the base 12 includes a diffusion chamber 24 that, in use, is covered by the diffuser plate 18. The top side of the base 12 also includes a plurality of fins 26 integrally formed therewith. The fins 26 are so spaced as to allow fresh air to flow therebetween as will be described hereinbelow.

Returning to FIG. 1, the air flow generator 20 includes an electric dc (direct current) motor 28 provided with a rotatable shaft 29 to which a fan 30 is mounted. The motor/fan assembly is mounted to the base 12 from underneath in a volute 32 defining an air channel provided under the fins 26. The volute 32 is open to the bottom side of the base 12 and is closed by a bottom cover 34. The volute 32 includes an outlet 36 in communication with the diffusion chamber 24 and an inlet 38 provided through the fins 26 (see FIG. 2). An air inlet control mechanism in the form of a slidable shutter 40 is so mounted to the base 12 as to be movable between open and closed positions to control the amount of fresh air entering the volute 32. A top plate 41 is secured on top of the fins 26 to force the air to flow between the fins 26 to reach the air inlet 38.

The portable stove 10 includes an energy source, in the form of a Peltier cell 23 mounted to the top side top plate 41 to power the electric motor 28. The Peltier cell 23 is covered by an extension 22 of the diffuser plate 18. Since the diffuser plate 18 is advantageously made of a heat conducting material, the extension 22 thereof has a generally high temperature when a biomass fire is present on the diffuser plate 18. The diffuser plate 18 and its extension 22 can be made of any heat conducting material that resists to the high temperature of fire, including aluminum, plated steel, stainless steel, etc. Of course, other means can be provided to transfer the heat to the Peltier cell 23.

As is generally known to those skilled in the art, Peltier cells include a Peltier Effect junction that creates enough electrical current when a temperature differential is created between opposite sides of the cell. By positioning the Peltier cell between the extension 22 of the diffuser plate 18 and the top plate 41 directly above the fins 26, the required temperature differential is created between the opposite surfaces of the Peltier cell 23 and electricity is generated from the Peltier cell 23. Indeed, the extension is at high temperature when a biomass fire is present on the diffuser plate 18 and the air flow between the fins 26 is at low temperature. Conventional wiring (not shown) is provided between the Peltier cell 23 and the motor 28.

The diffuser plate 18 includes a plurality of relatively small apertures 43. The number of apertures 43 and their diameter are optimized to have the suitable distribution of air flow. The diffuser plate 18 and the integral extension plate 22 are made of a high temperature resistant material, plating or coating such as enamel coated steel, stainless steel, graphite, titanium, or inconel, for example.

The peripheral edge of the diffuser plate 18 surrounds the diffusion chamber 24 in a snugly manner so as create a substantially air tight joint therewith. The diffuser plate 18 is removably mounted to the base 12 so as to facilitate the maintenance and eventual replacement thereof.

The foldable shield and holder 14 includes four (4) L-shaped rods 44 provided in the corners of the shield 14, two (2) straight rods 46 and six panels 48 allowing the shield 14 to be folded by bringing the straight rods 46 towards each other. Indeed, the rods 44, 46 and the panels 48 form six hinges.

The foldable shield and holder 14 and the base 12 are so configured and sized that when the shield 14 is in its operating position shown in FIG. 1, it may be mounted about the diffuser plate 18 by abutting the rods 44, 46 with recesses 50 of the base 12. The recesses 50 are associated with legs 52. When the shield 14 is in its folded position (not shown), it may be stored under the base 12, between the legs 52. It is to be noted that the legs 52 includes integral brackets 54 to help keep the folded shield 14 stored thereto.

The foldable shield and holder 14 generally defines a rectangular enclosure which serves two main purposes: shielding and support. The shielding function generally protects users from the flame produced therein, to hide the flame from the wind and to act as a chimney. The rods 44-46 provide support for objects to be heated by the stove 10. Among the rods 44-46, the four L-shaped rods 44 may swivel to be adjusted to the size and shape of the object to be heated. For example, the foldable shield and holder 14 can support an object as small as a soup can to an object with a large surface (more than 30 cm) containing over 10 liters. Of course, the plates 48 of the foldable shield and holder 14 further provide rigidity and support to the rods. The foldable shield and holder 14 can also be used to support or secure optional accessories (not shown).

The parts of the foldable shield and holder 14 are made from a high temperature resistant material, plating or coating such as enamel coated steel, stainless steel, graphite, titanium, inconel and carbon X™, for example.

In operation, a biomass fire is started on top of the diffuser plate 18 and the air flow generator 20 is started. The air flow generator 20, via the fan 30, forces air to be drawn in the volute 32 through the inlet 38 and between the fins 26. The quantity of air entering the volute 32 is controlled by the slidable shutter 40. The air flow generator 20 also forces the air to be supplied to the diffusion chamber 24 to thereby uniformly distribute the air flow therein. The air is allowed to exit through the plurality of small apertures 43 of the diffuser plate 18. Accordingly, the air exiting the apertures 43 under the action of the air flow generator 20 oxygenates the combustion of the biomass on the diffuser plate 18. It is to be understood that the quantity of air supplied to the fire through the apertures 43 can be controlled by the slidable shutter 40 as to be relatively small when the biomass fire has just been started and can be gradually increased as the biomass fire gets warmer.

It is to be noted that when a biomass fire has just been lighted on the diffuser plate 18, it produces a small temperature differential across the Peltier cell 23, generating a small current that allows the motor 28 to start slowly. In this manner, the airflow is not too strong to start a fire. As soon as the fire grows, the extension 22 pumps more heat from the diffuser plate 18 and raises the temperature differential between the two faces of the Peltier cell 23, thereby increasing the current produced thereby. To increase the temperature differential when the biomass fire is small, a lighted match or another external heat source can be positioned directly on top of the extension 22.

It is to be noted that the airflow also cools the base 12 to prevent the base 12 from becoming too hot.

Accordingly, the portable stove 10 is an active solid combustion system, configured to force the air to pass through the biomass fire giving all the oxygen required for an optimized combustion.

While the stove 10 described hereinabove includes a Peltier cell 23 to power the dc motor 28 of the air generator 20, it is to be noted that other power sources, such as batteries, could be used. Such batteries could be inserted in a compartment 42 or the volute 32 (see FIG. 1). It is to be noted that, if a battery is used, a switch (not shown) would be used to control the operation of the motor 28. According to a further embodiment (not shown), both of the two illustrated power sources can be used.

The stove 10 is further configured to receive an alternative energy source, such as an external power pack (not shown). This external energy source is connectable through a connector located, for example, on the leg 53.

One skilled in the art will understand that the base 12 is advantageously made from an aluminum injection die casting but can be made of other heat and corrosion resistant material, plating or coating such as plated steel, enamel steel, stainless steel, cupper alloy, graphite, ceramic, etc.

The configuration of the illustrated air flow generator 20 allows minimizing the overall dimensions of the stove 10 so as to facilitate its storage and transport.

It will also be noted that the sliding shutter 40 may be positioned so as to close the inlet 38 during transport to prevent foreign particles from entering the volute 32 and potentially damage the air flow generator 20.

Even though the stove 10 has been illustrated with the fins 26 and sliding shutter 40 positioned on the top side of the base 12, i.e. on the side of the base 12 opposite the legs 52, they can be positioned on the opposite side.

Moreover, the fins 26 can be configured so as to adjustable define vanes for the blower.

Turning now to FIGS. 3 to 9, a portable stove 100 according to a second illustrative embodiment of the present invention will be described. It is to be noted that since the portable stove 100 is very similar to the portable stove 10 illustrated in FIGS. 1 and 2 and described hereinabove, only the differences between these stoves will be described in details hereinbelow.

In FIG. 3, the stove 100 is shown in a deployed configuration, ready for use. In this functional arrangement, the foldable shield and holder 14 is deployed over the base 102.

The foldable shield and holder 14 is shown in a folded and stowed configuration in FIG. 4.

As can be seen from FIG. 5, the stove 100 has its air inlet 104 from the underside of the base 102 and does not include the fins 24 of the stove 10. The air flow generator 20 includes the motor 28 and the fan 30 to be mounted in the volute chamber 32 (see FIG. 7). The air inlet 104 is an opening of the bottom plate 106.

Figure 9:
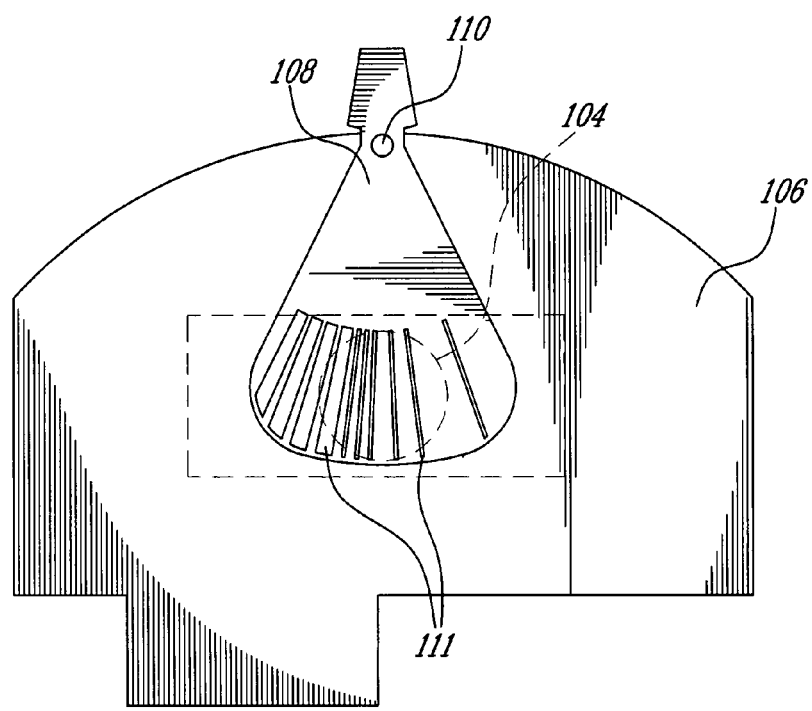
FIG. 9 is a bottom plan view of the intake flow control of the portable stove of FIG. 3.

FIG. 9 of the appended drawings illustrates the bottom plate 106 and the air inlet control mechanism in the form of a pivotable shutter 108 having a pivotal connection 110 and openings 111 therein that are spaced and sized as to vary the overall opening of the inlet 104 as it is pivoted. Furthermore, the openings 111 of the pivotable shutter 108 act as a filter, preventing big pieces of foreign matter from passing therethrough and potentially damaging the air flow generator 20. The bottom plate 106 and the pivotable shutter 108 are made from a rigid light material, such as thin sheet metal or plastic. The rigidity allows those parts to withstand the air vacuum created by the blower fan. Returning to FIG. 5, a cover 112 further prevents foreign matter from entering the volute 32 through the opening 104.

FIGS. 6 and 7 illustrate the fluid connection between the volute chamber 32 and the diffusion chamber 24 through the outlet 36 of the volute 32.

As can be seen in FIG. 5, the portable stove 100 includes a Peltier cell 114 mounted to the top side 116 of the base 102. The Peltier cell 114 is covered by an extension 118 of the diffuser plate 120. Since the diffuser plate 120 is advantageously made of a heat conducting material, the extension 118 thereof has a generally high temperature when a biomass fire is present on the diffuser plate 120. The diffuser plate 120 and its extension 118 can be made of any heat conducting material that resists to the high temperature of fire, including aluminum, plated steel, stainless steel, etc. Also, other means can be provided to transfer the heat to the Peltier cell 114.

Again, when a fire has just been lighted on the diffuser plate 120, it produces a small temperature differential across the Peltier cell 114, generating a small current that allows the motor 28 to start slowly. In this manner, the airflow is not too strong to start a fire. As soon as the fire grows, the extension 118 pumps more heat from the diffuser plate 120 and raises the temperature differential between the two faces of the Peltier cell 114, thereby increasing the current produced thereby.

It is also possible to power the motor 28 with an AA size battery or another battery such as an AAA size battery mounted in a battery holder compartment 122. When using a battery, a switch (not shown) may be provided to activate the motor 28. This switch may be a mechanical switch or a thermal switch. The thermal switch may be put at the same place as the Peltier cell 114, for example. When no battery is used, the battery compartment 122 can be used to store matches or dry fire starter.

The motor 28 can also be provided with a conventional connector (not shown) allowing to receive different energy source (not shown) such as a battery power pack, a solar adaptor, a conventional electrical adaptor for a car lighter, a residential facility or any alternative electrical source.

It is also to be noted that using two to four batteries in a power pack allows supplying the motor two (2) to four (4) times more energy compare to a single battery, yielding a corresponding increase in burning power.

It is to be noted that the legs 52 and their integral brackets 54 tabs can also be used as sliding rail for a drawer which can be part of a modular system (not shown) that includes the portable stove 100 as a burner.

The portable stoves 10 and 100 are preferably used for combusting all kinds of wood and other dry biomass combustibles. However, they may be also adapted for use with other kinds of fuel readily known to a person skilled in the art.

Figure 10:
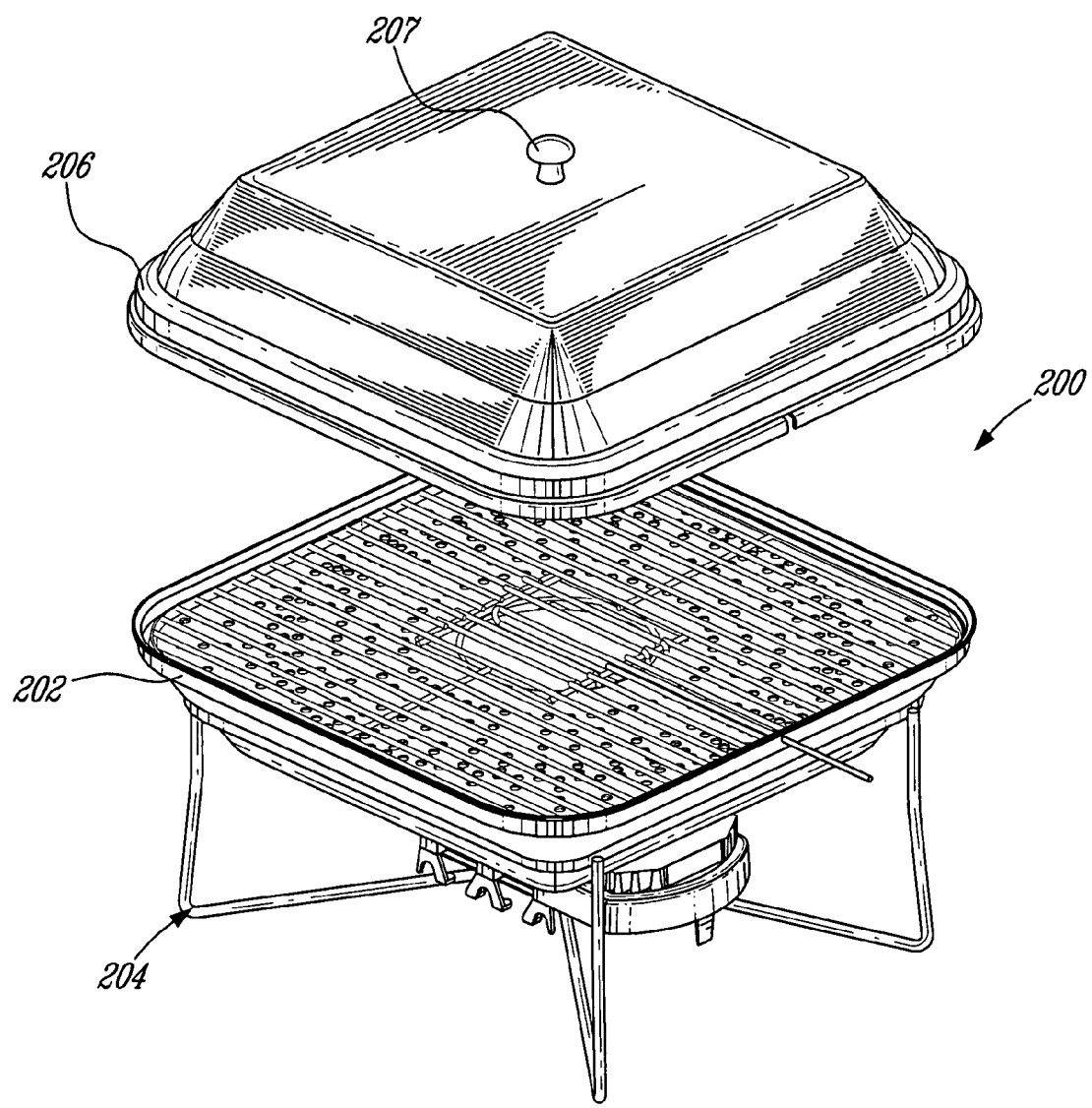
FIG. 10 is a perspective view of a BBQ grill using the portable stove of FIG. 1 as a power source; the BBQ grill having a fire control plate shown in a closed position.
Figure 11:
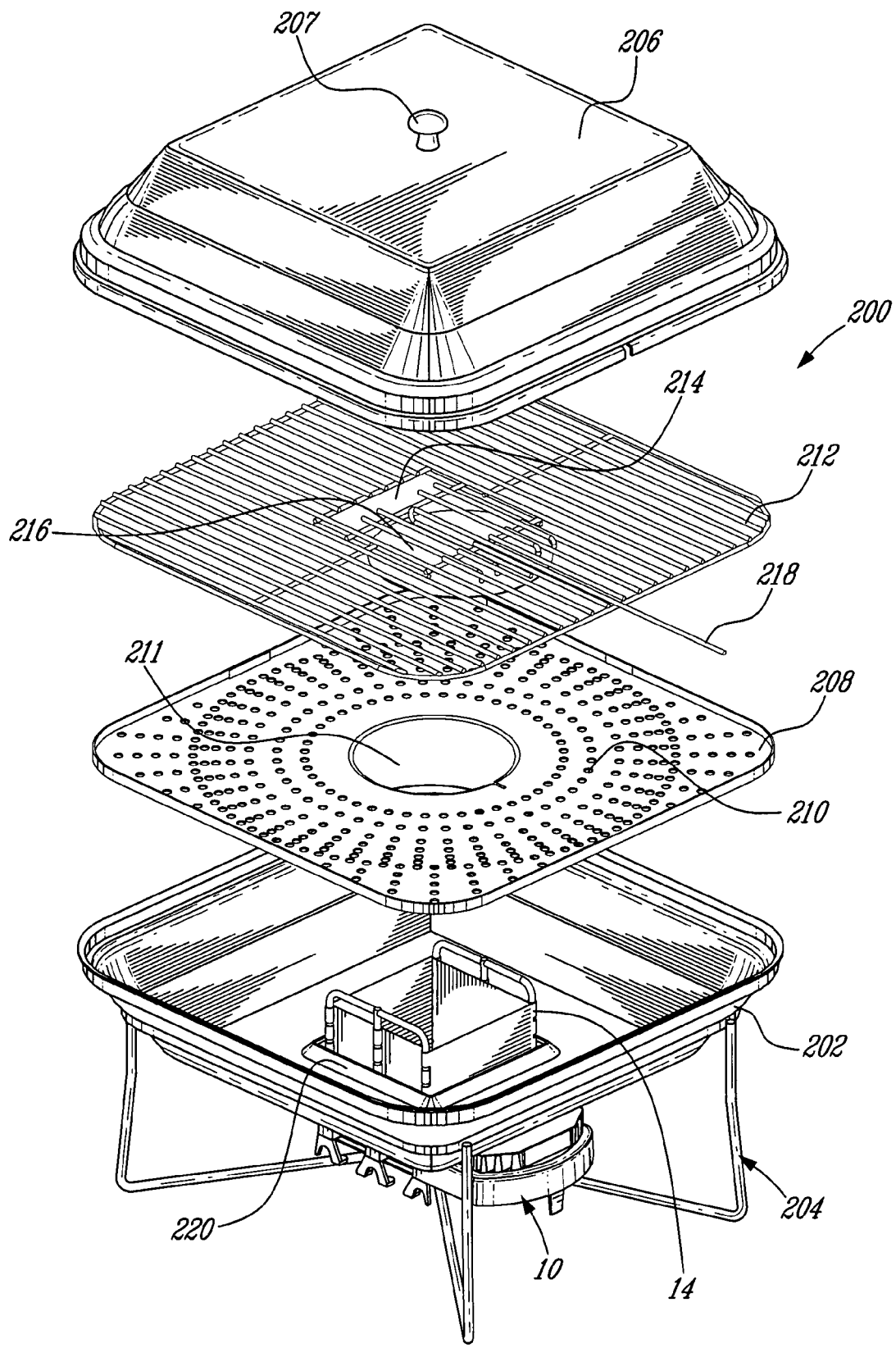
FIG. 11 is an exploded perspective view of the BBQ grill of FIG. 10 illustrating the fire control plate in a partially open position.

Turning now to FIGS. 10 to 12 of the appended drawings, an illustrative application of the portable stove 10 or 100 will be described used to power a BBQ grill 200 will be described. It is to be noted that while the stove illustrated as powering the BBQ 200 is the stove 10 illustrated in FIGS. 1 and 2, the stove 100 illustrated in FIGS. 3 to 9 could also be used.

The BBQ 200 includes a pan 202 mounted on a frame 204 and a cover 206 provided with a handle 207. As can be better seen from FIG. 11, a heat diffusion plate 208 provided with a plurality of small apertures 210 and a central opening 211 is received in the pan 202. A grill 212 is overlaid onto the plate 208. The grill 212 includes a central opening 214 that may selectively be closed by a central deflector 216 via a rod 218.

The central deflector 216 is movable between a centered position relatively to the opening 211 where the deflector 216 deflects and therefore uniformly distributes the flame under the plate 208 and a shifted position where the flames created by the stove 10 are let through the central opening 211 so as to heat a pot or any cooking dishes (not shown). This shifted position of the deflector 216 further allows access to the stove 10 to add combustible therein for example.

The pan 202 includes a square opening 220 so configured and sized as to allow the foldable shield 14 of the stove 10 therethrough forcing a central position of the stove 10 in the pan 202. The opening 220 of the pan 202 includes an inner edge provided to contain melted fat or any fluid, thereby preventing outflow. It is to be noted that, in operation, the heat radiated from the foldable shield 14 near the edge of the opening 220 of the pan 202 causes organic residue to carbonize, thereby facilitating the cleaning. The edge of the opening 220 of the pan 202 also secures the stove 10 in the assembly during operation.

It is to be noted that the base 202 and the cover 206 are advantageously identical, allowing their fabrication from a same mold.

Finally, as illustrated in FIG. 12, the frame 204 includes four legs 222 having curved ends 223 supporting a plate 226, which is secured thereto. The stove 10 is mounted to the BBQ 200 so as to rest on the plate 226. As can also be seen from this Figure, the legs 222 are interconnected through a ring 224 which is separate from the pan 202.

Accordingly, to assemble the BBQ grill 200, one installs the frame 224 at a desired location, places the stove 10 onto the plate 226, mounts the pane 202 in the frame 204 and then can sequentially install the diffuser 208, the grill 212 and the cover 206.

It is to be noted that the configuration and size of the BBQ grill 200 could be different from the one illustrated herein. As a non-limiting example, the body of the BBQ grill 200 could be circular instead of rectangular.

Also, accessories adapted to the pan and the diffuser can be provided for specific cooking needs (oven, rotisserie, steamer, etc.).

It is to be noted that many modifications could be made to the stoves 10 and 100 described hereinabove for example:

the legs and brackets 52, 54; the base 12, the rods 44, 46 may have other utilities, shapes, sizes and configurations;

other transducers capable of converting heat to electricity can be used as a power source for the blower motor. For example one or an array of thermopile, one or an array of thermocouples, one or an array of thermophotovoltaic cells or a combination thereof can also be used. It is also possible to use a mechanical spring or a flywheel to release a force that is converted into a torque transmitted to the fan 30. Such device is however to be wound up regularly to keep an average airflow;

the type of the impeller and motor and the configuration and sizes of the volute may vary considerably as it exists so many different ways to produce the optimized airflow;

the diffuser plate 18, 120 may also be permanently fixed or integrated to the base 12, 102;

the diffuser plate 18, 120 can be embossed so as to minimize its deformation under heat and as to allow a minimum air flow even when the diffuser plate is completely covered;

the airflow can be generated from a compressor device or another mechanical air pump;

the illustrated volute 32 is shown integrated with the base but could also be made from a distinct fixed or removable part;

even though the base 12, 102 according to the illustrated embodiments are configured to facilitate their fabrication by injection molding, other processes can be used for their manufacturing;

the legs 52 can be provided with apertures to help maximizing the air intake;

the configuration of the foldable shield and holder 14 may vary; it can also be made from a plurality of independent pieces which are configured to be mountable together to form the shield and holder;

the number of transducers used for generating electricity may vary depending for example on the blower motor;

the transducers can be installed all around the foldable shield 14, between the fins 26 or under the diffuser plate 18, 120 thereby acting as an electrical generator able to produce many watts of extra energy that can be cumulated in a accumulator device or rechargeable batteries, or dispense via an electrical outlet to another device.

Furthermore, it is to be noted that even though the base has been described has a one piece body, it can be assembled from many parts. For example, it can be made from two parts, wherein the portion of the base including the diffusion chamber forms a first part, while the rest of the base, including the volute, etc. defines the second part. An air tight joint is then provided between the outlet and the diffusion chamber.

It is to be understood that the invention is not limited in its application to the details of construction and parts illustrated in the accompanying drawings and described hereinabove. The invention is capable of other embodiments and of being practiced in various ways. It is also to be understood that the phraseology or terminology used herein is for the purpose of description and not limitation. Hence, although the present invention has been described hereinabove by way of illustrative embodiments thereof, it can be modified, without departing from the spirit, scope and nature of the subject invention as defined in the appended claims.

What is claimed is:

1. A portable stove comprising:
    a base provided with a diffusion chamber and an air channel having an outlet in fluid connection with the diffusion chamber and an inlet wherein the air channel includes a volute integrally mounted to the base;
    a diffuser plate mounted to the diffusion chamber; the diffuser plate defining a biomass support and being provided with at least one aperture;
    an air flow generator mounted in the volute and being so associated with the inlet of the air channel as to positively pressurize the diffusion chamber with air, wherein the air flow generator includes an electric motor and a fan associated with a rotatable shaft of the electric motor; and
    a Peltier cell in heat transfer relationship with the diffuser plate and coupled to power the electric motor;
    wherein the diffuser plate is made of a heat conductive material and includes an integral extension; one of the opposite faces of the Peltier cell being positioned adjacent the integral extension; whereby the one of the opposite faces is heated by the integral extension;
    whereby the air positively pressurizing the diffusion chamber exhausts through the at least one aperture of the diffuser plate to thereby oxygenate the combustion of the biomass.

2. A portable stove as recited in claim 1, wherein the diffuser plate is so mounted to the diffusion chamber as to form a substantially airtight joint therewith.

3. A portable stove as recited in claim 1, wherein the air channel includes a volute integrally mounted to the base.

4. A portable stove as recited in claim 3, wherein the air flow generator is mounted in the volute.

5. A portable stove as recited in claim 4, wherein the base includes a top side and a bottom side; the volute being open to the bottom side of the base.

6. A portable stove as recited in claim 5, wherein the base further includes a bottom cover closing the volute; the inlet or the air channel being defined by an opening of the bottom plate.

7. A portable stove as recited in claim 6, wherein the bottom plate includes an inlet air control mechanism.

8. A portable stove as recited in claim 7, wherein the inlet air control mechanism includes a pivotable shutter provided with openings.

9. A portable stove as recited in claim 4, wherein the base further includes a bottom plate closing the volute; the inlet of the air channel being defined by an opening of the top side of the base.

10. A portable stove as recited in claim 9, wherein the top side of the base further includes a plurality of fins.

11. A portable stove as recited in claim 10, wherein the top side of the base further includes a top plate so mounted to the fins as to allow air to pass between the fins to reach the inlet of the air channel.

12. A portable stove as recited in claim 11, wherein the top side of the base is provided with an inlet air control mechanism associated with the inlet of the air channel.

13. A portable stove as recited in claim 12, wherein the inlet air control mechanism includes a slidable shutter.

14. A portable stove as recited in claim 4, wherein the air flow generator includes an electric motor and a fan associated with a rotatable shaft of the electric motor.

15. A portable stove as recited in claim 14, wherein the fan is configured so as to draw air from the inlet of the air channel and to provide air flow in the diffusion chamber through the outlet of the air channel.

16. A portable stove as recited in claim 1, wherein the other of the opposite faces of the Peltier cell is adjacent the top side of the base; whereby the other of the opposite faces is cooled by air flowing in the volute.

17. A BBQ grill comprising a pan supported on legs, the pan including a generally central aperture so configured and sized as to receive the portable stove as recited in claim 1.

18. A BBQ grill as recited in claim 17, further comprising a deflector plate so mounted thereto as to be movable between a centered position relatively to the central aperture, wherein the deflector plate deflects and therefore uniformly distributes flames produced by the stove, and a shifted position relatively to the central aperture, wherein the flames produced by the stove are let through the central aperture.

19. A portable stove as recited in claim 1, wherein the shield is foldable; the stored configuration being a folded configuration; the base being further configured to store the foldable shield when the shield is in the stored configuration.

20. A portable stove as recited in claim 19, wherein the foldable shield includes six rods and six side panels defining, with the rods, six hinges.

21. A portable stove as recited in claim 20, wherein four of the six rods are L-shaped to define an adjustable holder.

22. A portable stove as recited in claim 21, wherein the base further includes legs provided with integral bracket so configured and sized as to maintain the foldable shield therebetween when the foldable shield is in the folded configuration.

23. A portable stove comprising:
a base provided with a diffusion chamber and an air channel having an outlet in fluid connection with the diffusion chamber and an inlet wherein the air channel includes a volute integrally mounted to the base;
a diffuser plate mounted to the diffusion chamber; the diffuser plate defining a biomass support and being provided with at least one aperture;
an air flow generator mounted in the volute and being so associated with the inlet of the air channel as to positively pressurize the diffusion chamber with air, wherein the air flow generator includes an electric motor and a fan associated with a rotatable shaft of the electric motor; and
at least one thermophotovoltaic cell positioned adjacent the diffuser plate to power the electric motor;
whereby the air positively pressurizing the diffusion chamber exhausts through the at least one aperture of the diffuser plate to thereby oxygenate the combustion of the biomass.

\* \* \* \* \*